P. L. MANLET.
AUTOMATIC STOP FOR ELEVATORS.
APPLICATION FILED JAN. 14, 1920.
Reissued May 4, 1920.
14,853.
Fig. 1
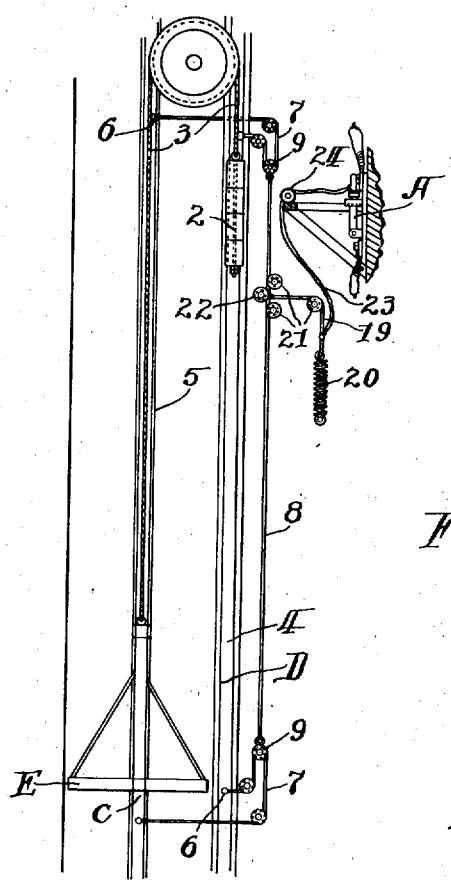
Fig. 2
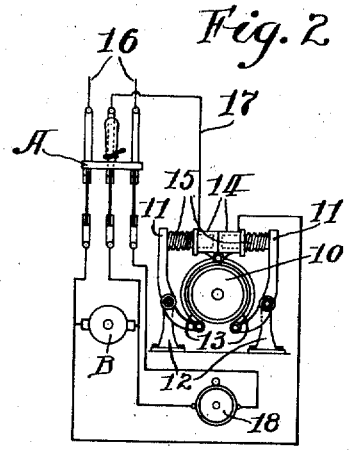
Fig. 3
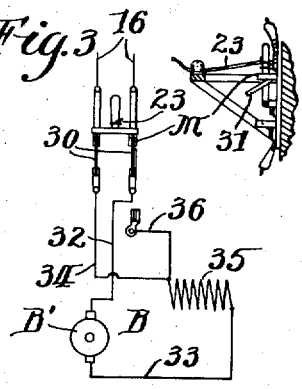
Fig. 4
Inventor:
Peter L. Manlet
by: Arnold Fischel
Att'y.

UNITED STATES PATENT OFFICE.

PETER L. MANLET, OF ST. PAUL, MINNESOTA.

AUTOMATIC STOP FOR ELEVATORS.

14,853. Specification of Reissued Letters Patent. Reissued May 4, 1920.

Original No. 1,158,255, dated October 26, 1915, Serial No. 651,628, filed September 27, 1911. Application for reissue filed January 14, 1920. Serial No. 351,510.

*To all whom it may concern:*

Be it known that I, PETER L. MANLET, a citizen of the United States, residing at St. Paul, in the county of Ramsey and State of Minnesota, have invented a new and useful Improvement in Automatic Stops for Elevators, of which the following is a specification.

My invention relates to improvements in automatic stops for elevators and its principal object is to provide a positive means for throwing off the power operating the elevator when the elevator car or the counterweights connected with it are carried beyond a predetermined point in their respective guide tracks.

It frequently happens that an elevator operator is unable to shut off his power in time to prevent the car from rising too high in the elevator shaft, damaging the car and shaft and tending to break the elevator cable through the momentum of the counterweights. In a similar way the car may require automatic stopping at the bottom of its path to prevent damage to the car and counter-weights.

Numerous devices are in use intended to apply brakes to the elevator car when it passes beyond its upper or lower limits, but which are frequently slow to operate or entirely ineffective.

The device which I have invented operates positively and instantly to cut off the power operating the elevator and utilizes the electricity generated by the operating motor to brake the same.

In the drawings with which I have illustrated my invention and which form part of my specification:

Figure 1 is a view of an elevator connected by my device with a main line switch and illustrating the use of a spring.

Fig. 2 is a diagrammatic view illustrating the application of my device to a magnetic brake by means of a three pole switch.

Fig. 3 is a diagrammatic view illustrating my device in connection with a dynamic brake.

Fig. 4 is an elevation of the switch shown in Fig. 3.

In Fig. 1, I have illustrated a main circuit switch A supplying power to the motor B shown in Fig. 2 operating an elevator car E which moves in the car track C. A counter-weight guide D is shown in which slide the counter-weights 2 connected to the elevator car in the ordinary manner by cables 3. The guides D are formed with grooves 4 carrying the ends of the counter-weights 2. The track C also has a groove 5 or equivalent trackway to receive a guide part on the elevator car E. A frangible releasing or stopping means 6 is fixed in the guide groove 5 of the track C at the upper extremity of the path of the elevator car and is connected to a flexible cord or chain 7, which connects with a similar peg 6 in the groove 4 of the guide D. Pegs 6 are similarly positioned in the grooves 4 and 5 at the lower limit of the path of the elevator car and counter-weight and connected by a chain 7 with a chain 8 which extends vertically and has pulleys 9 at its extremities running freely in the loops of the chains 7 and connecting them in such a way that the releasing of any peg 6 produces slack in the chain 8.

The motor B has a friction wheel 10 in connection with it and brake arms 11 pivoted on a support 12 to operate the band brake 13 on the friction wheel 10 to stop the elevator car connected with it. The brake arms 11 are operated by solenoids 14 and opposed springs 15 mounted on them, the solenoids 14 normally holding the band brake 13 out of contact with the friction wheel 10 and the springs 15 tending to tighten the brake on the wheel when the solenoids become inoperative.

Referring to Fig. 2, the switch A has connected with it main line conductors 16 and conductors 17 connecting the motor B and the solenoids 14 in parallel with each other and in series with the controller 18 which is positioned in the elevator car. A chain 19 connects with a spring 20, passes between suitable pulleys 21 and terminates in a pulley 22 running freely on the chain 8. The chain 19 holds the spring 20 in tension and any slack in the chain 8 permits the contraction of the spring 20. In case the chain 8 becomes worn and breaks, the switch A is instantly operated in this way protecting the device from inefficiency on account of age and wear. A chain 23 is connected with the spring to be pulled by it, passing over a suitable pulley 24 to the switch A, which it is adapted to operate when the spring 20 is released, by the breaking of any one of the pegs 6, and contracts. The opening of the switch A breaks the circuits through the conductors 16 and 17, thus stopping the application of power to the motor B and applying the brake to the friction wheel 10.

In Figs. 3 and 4, I have illustrated an alternative construction of my invention in which the main line conductors 16 connect with a switch M which has two blades 30 operating in the closed position of the switch, as shown in the figures, and an auxiliary blade 31 attached to one of the blades 30. In the closed position of the switch the current passes through conductors 32, 33 and 34 and the field 35. When the switch is opened the main line circuit is broken and the armature B′, when rotating, will generate current. The blade 31 makes contact with the conductor 36 closing the circuit from the motor through the motor field 35, conductor 33, through armature B′ and conductor 32, producing a dynamic brake, gradually stopping the motor and elevator connected therewith.

It is evident that a suitable weight may be used in place of the spring 20 described and that other power means besides the electric power described in the specification may be used in connection with the electrically operated brake mechanism shown.

In accordance with the patent statutes I have described the principles of operation of my invention together with the apparatus which I now consider to represent the best embodiment thereof, but I desire to have it understood that the construction shown is only illustrative and that the invention can be carried out by other means and applied to uses other than those above set forth within the scope of the following claims:

Having described my invention, what I claim as new and desire to protect by Letters Patent is:—

1. In a device of the class set forth, an elevator car operable in a fixed path, an electric motor adapted to operate said car, a brake for said motor, means for operating said brake, resilient means arranged to urge the operating means into position to cause the setting of said brake, and frangible means holding said resilient means under stress and the operating means inactive and positioned in a path to be broken by said car and to release the resilient means when the car moves beyond its normal travel.

2. In a device of the class set forth, an elevator car operable in a predetermined path of travel, a frangible stopping means positioned in the path of said car, a motor adapted to operate said car, a switch adapted to control said motor, means for connecting said stopping means and switch to operate the latter when said stopping means is released by said car moving beyond its normal travel, and an electric brake connected with said switch and adapted to be automatically operated by the opening of said switch.

3. In a device of the class set forth, a guideway, an elevator car operating in said guideway, an electric motor adapted to operate said car, frangible means positioned in said guideway in the path of said car adjacent the limit of its normal travel, a brake for said car, means for setting said brake, electric means for holding said brake out of operation, a source of power connected with said electric means, means for disconnecting said electric means from said source of power, and a connection between said frangible means and said means for disconnecting said power, whereby upon the breaking of said frangible means by said car said brake is adapted to stop said car.

4. In a device of the class set forth, an elevator car movable through a normal path of travel, means for operating said car, a friction brake on said operating means, a solenoid mounted in connection with said brake adapted when energized to to hold said brake out of operation, an electrical switch connected with said solenoid, and a frangible stop in connection with said car adapted to be broken when said car passes a limit of its normal travel and cause the opening of said switch and setting of said brake.

PETER L. MANLET.